US00RE45935E

(19) United States
(12) Reissued Patent
Taufer

(10) Patent Number: US RE45,935 E
(45) Date of Reissued Patent: Mar. 22, 2016

(54) CONTAINER FOR HOLDING FOODS AND DRINKS

(71) Applicant: Edward L. Taufer, Voorhees, NJ (US)

(72) Inventor: Edward L. Taufer, Voorhees, NJ (US)

(21) Appl. No.: 14/313,658

(22) Filed: Jun. 24, 2014

Related U.S. Patent Documents

Reissue of:
(64) Patent No.: 8,485,383
Issued: Jul. 16, 2013
Appl. No.: 11/650,094
Filed: Jan. 5, 2007

(51) Int. Cl.
*B65D 1/24* (2006.01)
*A47G 19/06* (2006.01)
*B65D 25/28* (2006.01)
*B65D 25/42* (2006.01)
*B65D 25/04* (2006.01)

(52) U.S. Cl.
CPC ..... *A47G 19/06* (2013.01); *B65D 25/04* (2013.01); *B65D 25/2811* (2013.01); *B65D 25/42* (2013.01)

(58) Field of Classification Search
CPC ... A47G 19/06; A47G 19/22; A47G 19/2205; A47G 19/2222; A47G 19/2226; A47G 19/2272; B65D 25/04; B65D 25/2811; B65D 25/42
USPC ..... 220/523, 500, 501, 23.86, 23.83, 705, 220/709; 215/229, 387; 426/120; 206/217
See application file for complete search history.

(56) References Cited

U.S. PATENT DOCUMENTS 647,925 A * 4/1900 Kirby ..... 220/521
1,368,640 A * 2/1921 Melchior ..... 141/340
1,665,289 A * 4/1928 Weaver ..... 229/400
2,326,414 A * 8/1943 Thompson ..... 220/4.27
2,355,010 A * 8/1944 Pera ..... 220/710
3,288,344 A * 11/1966 Woollen et al. ..... 229/103.1
3,558,033 A * 1/1971 Leeds ..... B65D 77/283 215/389
4,050,484 A * 9/1977 Danyo ..... 141/34
4,252,256 A * 2/1981 Walsh ..... A45F 3/20 215/380
5,005,717 A * 4/1991 Oilar ..... 215/13.1
5,180,079 A * 1/1993 Jeng ..... 220/705
5,195,567 A * 3/1993 Tyree, Jr. ..... 141/331
5,222,940 A * 6/1993 Wilk ..... 604/77
5,388,712 A * 2/1995 Brody ..... 215/229
5,535,889 A * 7/1996 Lin ..... 206/546
5,725,117 A 3/1998 Berjis
5,987,913 A * 11/1999 Andrzejczak ..... 62/457.2
6,264,068 B1 * 7/2001 Ours et al. ..... 222/129
6,276,559 B1 * 8/2001 DeMars ..... A47G 19/2266 215/229
D449,092 S * 10/2001 Brog ..... D19/194
6,338,417 B1 * 1/2002 Ferraro ..... 220/23.83
6,394,302 B1 * 5/2002 Query, Jr. ..... 220/707
6,474,494 B1 * 11/2002 Miller ..... 220/379
6,527,137 B1 * 3/2003 Kleckauskas ..... A47G 19/2266 215/388
7,111,748 B2 * 9/2006 Cha ..... 220/4.27
7,217,434 B1 * 5/2007 Loh ..... B65D 81/3205 206/217
7,437,990 B2 * 10/2008 Duch ..... 99/297
7,717,144 B1 * 5/2010 Bottega ..... 141/338
2002/0110622 A1 * 8/2002 Lloyd et al. ..... 426/115
2004/0169039 A1 * 9/2004 Freeman ..... 220/8
2004/0178203 A1 * 9/2004 Rau ..... 220/500

(Continued)

*Primary Examiner* — Patricia Engle
(74) *Attorney, Agent, or Firm* — Paul A. Taufer

(57) ABSTRACT

A container includes multiple compartments for holding drinks and food. In an exemplary embodiment, a first compartment holds a drink of choice, such as soda, water or juice, and a second compartment holds a food of choice, such as popcorn, pretzels or chips. A third compartment may also be provided for holding a second food of choice, such as candy.

15 Claims, 1 Drawing Sheet

(56) References Cited

U.S. PATENT DOCUMENTS

2004/0256401 A1* 12/2004 Chodosh ..... 220/912
2005/0269336 A1* 12/2005 Rockhill et al. ..... 220/705
2008/0023473 A1* 1/2008 Spyros et al. ..... 220/23.86
2008/0164253 A1* 7/2008 Truong ..... 220/4.27
2012/0061409 A1* 3/2012 Fioritto ..... A47G 19/2272 220/708
2012/0273500 A1* 11/2012 Yao ..... 220/521
2013/0098923 A1* 4/2013 Sandoval ..... 220/574
2013/0233858 A1* 9/2013 Elberg ..... 220/504

* cited by examiner

CONTAINER FOR HOLDING FOODS AND DRINKS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention generally relates to containers for holding items and more particularly the present invention relates to containers for holding food and drinks.

BACKGROUND

Food and drinks are oftentimes consumed together, such as during meals or in between meal snacks. Drinks are typically provided in one container, such as a cup or glass, and food provided in a separate container, such as a dish, tray or cup. Depending on the nature of the use, the containers are either reusable, such as being made of plastic, glass or ceramics, or disposable, such as being made of paper or cardboard. In either situation, however, it is cumbersome for a single individual to hold and carry food and drinks in separate containers. For example, at a movie theatre, a person may purchase popcorn that is provided within a paper box or cup, soda that is provided in a paper cup and candy that is prepackaged in a paper box. It is difficult if not impossible for one person to carry all of these items, especially considering it is also necessary for other items to be carried as well, such as tickets, coats and handbags, and for doors to be opened to enter the theatre and seats unfolded in order to sit down. Moreover, once seated, it is awkward for one person to have to continue to hold each of these items during the movie.

In view of the foregoing, it is desirable to provide a single container to hold drinks and food.

SUMMARY

A container includes multiple compartments for holding drinks and food. In an exemplary embodiment, a first compartment holds a drink of choice and a second compartment holds a food of choice. A third compartment may also be provided for holding a second food of choice. Additional compartments may also be provided where desired.

DETAILED DESCRIPTION

The following describes, with reference to the attached drawings, and for illustration purposes only, various exemplary embodiments in accordance with the present invention.

Figure 1:
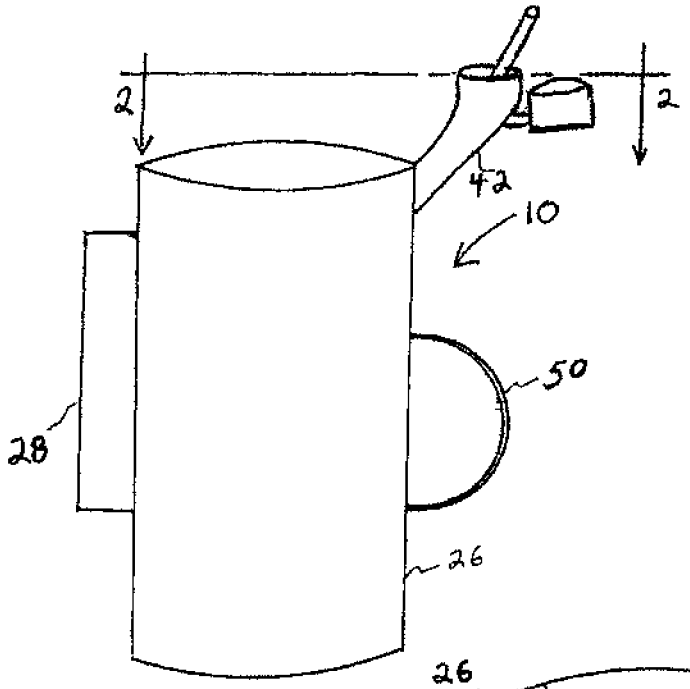
FIG. 1 is an exemplary embodiment of a container in accordance with the present invention.
Figure 2:
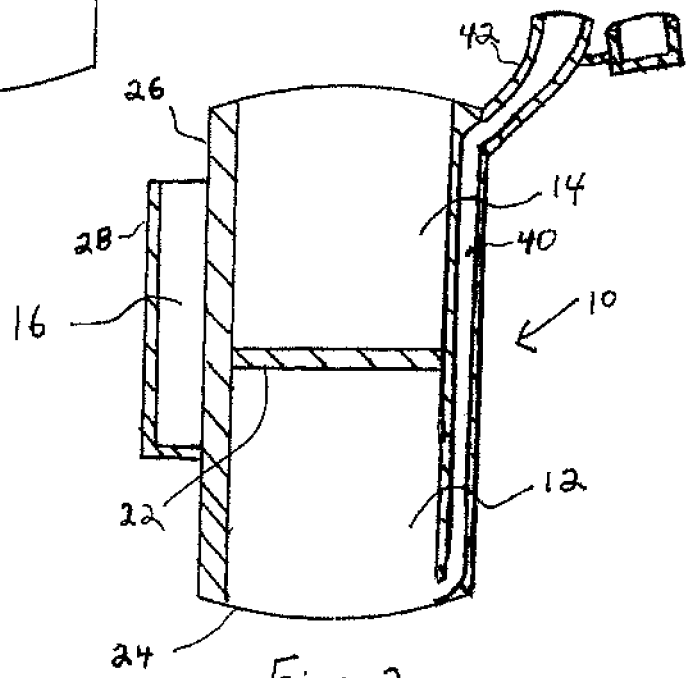
FIG. 2 is a front cross-sectional view taken along the lines 2-2 of FIG. 1.

As described herein is an exemplary embodiment of a container in accordance with the present invention. The container as described herein may comprise any desired number of compartments for holding food and/or drinks and may be of any desired shape, size and/or composition. As illustrated in FIGS. 1 and 2, a container 10 is provided having a plurality of compartments comprising three compartments 12, 14, and 16, which will be described in more detail below. As should be understand, any number of compartments may be provided where desired.

In the present embodiment, the compartment 12 is adapted to hold a liquid of choice, such as, without limitation, soda, juice, water, tea or coffee. Both hot and cold liquids may be used within the compartment 12. Compartment 12 as shown in FIG. 1 comprises a generally cylindrical shaped cavity defined by opposing upper and lower walls 22 and 24 circular in shape connected by a shell 26 cylindrical in shape.

Compartment 14 is adapted to hold a food of choice, such as, without limitation, bulk snack foods in the nature of popcorn, pretzels and potato chips, as examples. As should be understood, other types of foods may also be utilized as well. In the illustrated embodiment, compartment 14 comprises a generally cup-shaped cavity defined by the circular upper wall 22 connected with the cylindrical shell 26. The shell 26 extends beyond the upper wall 22 and continues to a terminating end of the container 10 defining the second compartment 14. In use, food can be placed directly into the compartment 14, such a by hand or through use of a scoop, as examples. The separation and isolation between the compartments 12 and 14 operates to keep the food free from moisture and completely dry. An optional cap may be provided on the end of the cylindrical shell 26 to retain the items within the compartment 14. The cap may be a separate item attachable to the container 10 or may be provided directly attached to the cylindrical shell 26, such as by a hinge or connector portion, and opened or closed as desired.

Compartment 16 in the present embodiment comprises a cavity defined by the cylindrical shell 26 and a spaced outer wall 28 connected at opposite ends to the cylindrical shell 26. In this embodiment, the outer wall 28 and the cylindrical shell 26 create a generally rectangular shape to the compartment 16, although any desired shape may be provided as desired. Compartment 16 is adapted to hold a second food of choice, which in the present embodiment comprises a prepackaged item, such as, without limitation, rectangular boxes of candy or other items. As should be understood, items of any other shapes or sizes may also be utilized that are suitable to fit within the compartment 16. In certain embodiments, the outer wall 28 may be resilient relative to the shell 26, such as due to the material of the outer wall 28 or due to the addition of a resilient member, such as a spring or rubber portion. In such embodiments, the resiliency of the outer wall 28 may facilitate placing and securing of the second food of choice within the compartment 16.

The container 10 further comprises a channel 40 provided in the cylindrical shell 26 and which extends into the compartment 12 at one end and into a cone-shaped funnel 42 at a second end. The cone-shaped funnel 42 is connected with and extends outwardly from the cylindrical shell 26 proximate its upper end and adjacent to the compartment 14. As will be described in more detail below, the combination of the cone-shaped funnel 42 and channel 40 operate to allow liquid along with ice if desired to enter into and fill the compartment 12, such as by pouring the liquid from a soda gun or other container into the cone-shaped funnel 42. In addition, the liquid can then exit out from the compartment 12 via a straw that is placed into the funnel 12 and through the channel 40, in order to reach the liquid within the compartment 12. The opening through the funnel 42 and channel 40 may alternatively serve as an "integral" straw. An optional cap may also be provided to go onto the end of the funnel 42. The cap may be a separate member or the cap may be secured to the funnel 42, such as by a hinge or connector portion, and placed onto or off of the end of the funnel as desired.

In this embodiment, an optional handle 50 is also provided connected with the cylindrical shell 26. The handle in this embodiment is generally arch shaped, although any other shapes or number of handle portions may also be provided.

The container 10 may be comprised of separate components connected together or may be comprised of a one-piece, unitary construction. In some exemplary embodiments, the components may be detachable for cleaning or storing, such as where the container is of a reusable construction. Any suitable connectors may be utilized to secure the components, such as, for example, a threaded engagement between the first and second compartments. Any desired shape and/or configuration may be utilized for the container 10 and its various elements, including, without limitation, the compartments 12, 14 and 16, cylindrical shell 26, funnel 42 and handle 50; for example, cylindrical as shown in FIGS. 1 and 2, or alternatively box shaped, rectangular, triangular, any combination of the foregoing, or any other shapes. In addition, it should be understood that the various elements of the container 10 may be provided at any desired location, and the embodiment illustrated in FIGS. 1 and 2 is in no way intended to be limiting as to the possible locations for where the various elements of the container 10 may be provided, including, without limitation, the compartments 12, 14 and 16, funnel 42, channel 40, and handle 50. The container 10 may be made utilizing conventional forms of manufacture or any other conventional manner known to one skilled in the art, and from any suitable material or materials, such as, without limitation, plastic, cardboard, paper, glass, combinations of the foregoing or other suitable materials. In certain embodiments, the container 10 may be made of paper and/or cardboard or other such types of materials to keep costs of the materials to a minimum, so as to make it more practical for applications where the container is to be disposable after each use.

The embodiments as described herein are not intended in any way to limit the broad features or principles of the present invention, or the scope of patent monopoly to be granted. It should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The invention claimed is:

1. A container for simultaneously holding liquids and foods to be consumed by a user comprising:

a first compartment for holding a liquid of choice for consumption by said user, the first compartment comprising spaced upper and lower walls connected by a shell to define an enclosed structure that includes it central cavity into which the liquid of choice is held;

a second compartment for holding a food of choice for consumption by said user, the second compartment being adjacent to and connected with the first compartment, wherein the second compartment is defined by the upper wall and the shell, with the upper wall defining a solid structure that operates as a barrier so that the second compartment is isolated from the first compartment in order to keep the liquid from entering the second compartment so that the food of choice within the second compartment is kept dry, and with the shell extending beyond the upper wall in a direction opposite the first compartment and continues to a terminating end, wherein the second compartment defines a structure that includes an upper cavity within the terminating end of the shell into which the food of choice is held;

a channel extending through the shell and into the central cavity of the first compartment;

wherein the channel operates as a two-way passage between the central cavity and environment outside of the first compartment, so that a) through which the liquid of choice is provided for filling of the central cavity of the first compartment and b) through which a user may consume the liquid of choice contained in the central cavity;

wherein the container further comprises a funnel connected with the shell at the location of the second compartment and with the funnel having a passage therethrough connected with the channel, the funnel further having a terminating end into which liquid can both be provided to fill the central cavity in the first compartment and taken out from the central cavity to be consumed from the first compartment by the user, wherein the user can consume the liquid from the central cavity by either sucking upon the terminating end of the funnel or inserting a straw into the terminating end and through the passage and channel to enter the central cavity and sucking upon the straw.

2. The container of claim 1, wherein the container further comprises a handle connected with the shell for a user to hold the container.

3. The container of claim 2, wherein the container further comprises a cap for placement onto the shell for enclosing the second compartment, in order to retain the food of choice within the second compartment.

4. The container of claim 3, wherein the container further comprises a cap for enclosing the passage in the funnel in order to retain the liquid within the first compartment.

5. The container of claim 4, further comprising as straw extending within the passage in the funnel, the channel and into the first compartment.

6. A container having a plurality of compartments for holding liquid and food at the same time comprising:

spaced upper and lower walls connected by a shell defining a first compartment, with the first compartment for holding a liquid of choice, the first compartment defining an enclosed structure that includes a central cavity into which the liquid of choice is held;

the shell extending beyond the upper wall and continuing to a terminating end defining a second compartment, the second compartment for holding a food of choice and isolated from the first compartment in order to keep the liquid from entering the second compartment, the second compartment being integrally connected and fixed to the first compartment, wherein the second compartment defines a structure that includes an upper cavity within the terminating end of the shell into which the food of choice is held, and with the upper wall defining a solid structure that operates as a barrier so that the second compartment is isolated from the first compartment in order to keep the liquid from entering the second compartment so that the food of choice within the second compartment is kept dry;

an outer wall spaced from the shell and with the outer wall having one or more end portions connected with the shell as defining a third compartment for holding a second food of choice;

a channel extending through the shell and into the central cavity of the first compartment, wherein the shell is defined by an outer surface and an inner surface at spaced separation, with the channel defining a first end located [in] *adjacent to* the second compartment and protruding through the outer surface of the shell, the channel extending within the spaced separation in a substantially longitudinal direction from the second compartment and toward the first compartment, and the channel further defining a second end located in the first compartment and protruding through the inner surface of the shell, wherein the channel is the only opening in the first compartment and operates as a two-way passage between the central cavity and environment outside of the first compartment, so that a) through which the liquid of choice is provided for filling of the central cavity of the first compartment without requirement to open or disassemble any portion of the first compartment and b) through which a user may consume the liquid of choice contained in the central cavity; and a funnel integrally connected with the shell at the location of the second compartment and with the funnel having a passage therethrough connected with the channel, the funnel further having a terminating end into which liquid is both provided to fill the central cavity in the first compartment and taken out from the central cavity to be consumed from the first compartment by the user, wherein the user can consume the liquid from the central cavity by either sucking upon the terminating end of the funnel or inserting a straw into the terminating end and through the passage and, channel to enter the central cavity and sucking upon the straw.

7. The container of claim 6, wherein the container comprises a one-piece, unitary construction.

[8. A container for simultaneously holding liquids and foods to be consumed by a user comprising:

a first compartment for holding a liquid of choice for consumption by said user, the first compartment comprising spaced upper and lower walls connected by a shell to define an enclosed structure that includes a central cavity into which the liquid of choice is held;

a second compartment for holding a food of choice for consumption by said user, the second compartment being adjacent to and connected with the first compartment, wherein the second compartment is defined by the upper wall and the shell, with the upper wall defining a solid structure that operates as barrier so that the second compartment is isolated from the first compartment in order to keep the liquid from entering the second compartment so that the food of choice within the second compartment is kept dry, and with the shell extending beyond the upper wall in a direction opposite the first compartment and continues to a terminating end, wherein the second compartment defines a structure that includes an upper cavity within the terminating end of the shell into which the food of choice is held;

a channel extending through the shell and into the central cavity of the first compartment, wherein the shell is defined by an outer surface and an inner surface at spaced separation, with the channel defining a first end located in the second compartment and protruding through the outer surface of the shell, the channel extending within the spaced separation in a substantially longitudinal direction from the second compartment and toward the first compartment, and the channel further defining a second end located in the first compartment and protruding through the inner surface of the shell;

wherein the channel operates as a two-way passage between the central cavity and environment outside of the first compartment, so that a) through which the liquid of choice is provided for filling of the central cavity of the first compartment and b) through which a user may consume the liquid of choice contained in the central cavity.]

[9. The container of claim 8, wherein the container comprises a one-piece, unitary construction.]

[10. The container of claim 8, further comprising a third compartment for holding a second food of choice.]

[11. The container of claim 10, wherein the container further comprises an outer wall spaced from the shell and with the outer wall having one or more end portions connected with the shell as defining the third compartment.]

12. A container having a plurality of compartments for holding liquid and food at the same time comprising:

spaced upper and lower walls connected by a shell defining a first compartment, with the first compartment for holding a liquid of choice, the first compartment defining an enclosed structure that includes a central cavity into which the liquid of choice is held;

the shell extending beyond the upper wall and continuing to a terminating end defining a second compartment, the second compartment for holding a food of choice and isolated from the first compartment in order to keep the liquid from entering the second compartment, the second compartment being integrally connected and fixed to the first compartment, wherein the second compartment defines a structure that includes an upper cavity within the terminating end of the shell into which the food of choice is held, and with the upper wall defining a solid structure that operates as a barrier so that the second compartment is isolated from the first compartment in order to keep the liquid from entering the second compartment so that the food of choice within the second compartment is kept dry;

a channel extending through the shell and into the central cavity of the first compartment, wherein the shell is defined by an outer surface and an inner surface at spaced separation, with the channel defining a first end located [in] *adjacent to* the second compartment and protruding through the outer surface of the shell, the channel extending within the spaced separation in a substantially longitudinal direction from the second compartment and toward the first compartment, and the channel further defining a second end located in the first compartment and protruding through the inner surface of the shell, wherein the channel is the only opening in the first compartment and operates as a two-way passage between the central cavity and environment outside of the first compartment, so that a) through which the liquid of choice is provided for filling of the central cavity of the first compartment without requirement to open or disassemble any portion of the first compartment and b) through which a user may consume the liquid of choice contained in the central cavity; and a funnel integrally connected with the shell at the location of the second compartment and with the funnel having a passage therethrough connected with the channel, the funnel further having a terminating end into which liquid is both provided to fill the central cavity in the first compartment and taken out from the central cavity to be consumed from the first compartment by the user, wherein the user can consume the liquid from the central cavity by either sucking upon the terminating end of the funnel or inserting a straw into the terminating end and through the passage and channel to enter the central cavity and sucking upon the straw.

*13. A container for simultaneously holding liquids and foods to be consumed by a user comprising:*

*a first compartment for holding a liquid of choice for consumption by said user, the first compartment comprising spaced upper and lower walls connected by a shell to define an enclosed structure that includes a central cavity into which the liquid of choice is held;*

*a second compartment for holding a food of choice for consumption by said user, wherein the second compartment is adjacent to and connected with the first compartment, wherein the second compartment is defined by the upper wall and the shell, with the upper wall defining a solid structure that operates as a barrier so that the second compartment is isolated from the first compartment in order to keep the liquid from entering the second compartment so that the food of choice within the second compartment is kept dry, and with the shell extending beyond the upper wall in a direction opposite the central cavity of the first compartment and continues to a terminating end, wherein the second compartment defines a structure that includes an upper cavity within the terminating end into which the food of choice is held;*

*a connector for releasably securing the first compartment and the second compartment so that the first compartment and the second compartment may be secured together for use and detachable, the connector comprising portions of the first compartment and the second compartment for directly connecting and disconnecting the first compartment and the second compartment, the central cavity of the first compartment being uncovered when the first compartment and the second compartment are disconnected, and the central cavity of the first compartment being covered by the second compartment when the first compartment and the second compartment are connected together, so that the liquid of choice is retained within the central cavity;*

*a channel extending through the shell and into the central cavity of the first compartment, wherein the shell is defined by an outer surface and an inner surface at spaced separation, with the channel defining a first end located adjacent to the second compartment and protruding through the outer surface of the shell, the channel extending within the spaced separation in a substantially longitudinal direction from the second compartment and toward the first compartment, and the channel further defining a second end located in the first compartment and protruding through the inner surface of the shell; and*

*a straw positioned in and extending through the channel, with the straw including a first end extending out of the channel in a first direction from the inner surface of the shell toward the central cavity of the first compartment for contacting the liquid of choice retained within the central cavity, the straw further including a second end extending out of the channel in a second direction from the outer surface of the shell toward the environment outside of the first compartment through which a user may consume the liquid of choice contained in the central cavity.*

*14. The container of claim 13, further comprising a cap having a connector portion directly attached to the container, the cap sized at least as large as a diameter of the upper cavity of the second compartment, with the cap movable to a closed position adjacent to the terminating end of the second compartment for enclosing the cavity of the second compartment in order to retain the food of choice within the second compartment and movable away from the terminating end of the second compartment to an open position so that the cavity is accessible to gain access to the food of choice within the second compartment, the connector portion of the cap remaining directly attached to the container when the cap is in the closed position and the open position, and while the cap is being moved between the open and closed positions.*

*15. The container of claim 13, further comprising a third compartment for holding a second food of choice.*

*16. The container of claim 15, wherein the container further comprises an outer wall spaced from the shell and with the outer wall having one or more end portions connected with the shell as defining the third compartment.*

*17. The container of claim 13, wherein the connector between the first compartment and the second compartment comprises a snap-fit connection.*

*18. The container of claim 13, further comprising a funnel connected with the shell at the location of the second compartment and with the funnel having a passage therethrough connected with the channel.*

*19. A container for simultaneously holding liquids and foods to be consumed by a user comprising:*

*a first compartment for holding a liquid of choice for consumption by said user, the first compartment comprising spaced upper and a lower walls connected by a shell to define an enclosed structure that includes a central cavity into which the liquid of choice is held;*

*a second compartment for holding a food of choice for consumption by said user, wherein the second compartment is adjacent to and connected with the first compartment, wherein the second compartment is defined by the upper wall connected by the shell, with the upper wall defining a solid structure that operates as a barrier so that the second compartment is isolated from the first compartment in order to keep the liquid from entering the second compartment so that the food of choice within the second compartment is kept dry, and with the second shell extending beyond the upper wall in a direction opposite the central cavity of the first compartment and continues to a terminating end, wherein the second compartment defines a structure that includes an upper cavity within the terminating end into which the food of choice is held;*

*a connector for releasably securing the first compartment and the second compartment so that the first compartment and the second compartment may be secured together for use and detachable, the connector comprising portions of the first compartment and the second compartment for directly connecting and disconnecting the first compartment and the second compartment, the central cavity of the first compartment being uncovered when the first compartment and the second compartment are disconnected, and the central cavity of the first compartment being covered by the second compartment when the first compartment and the second compartment are connected together, so that the liquid of choice is retained within the central cavity, wherein the connector between the first compartment and the second compartment comprises a snap-fit connection;*

*a channel extending through the shell and into the central cavity of the first compartment, wherein the shell is defined by an outer surface and an inner surface at spaced separation, with the channel defining a first end located adjacent to the second compartment and protruding through the outer surface of the shell, the channel extending within the spaced separation in a substantially longitudinal direction from the second compartment and toward the first compartment, and the*

*channel further defining a second end located in the first compartment and protruding through the inner surface of the shell; and*

*a straw positioned in and extending through the channel, with the straw including a first end extending out of the channel in a first direction from the inner surface of the shell toward the central cavity of the first compartment for contacting the liquid of choice retained within the central cavity, the straw further including a second end extending out of the channel in a second direction from the outer surface of the shell toward the environment outside of the first compartment through which a user may consume the liquid of choice contained in the central cavity; and*

*a cap having a connector portion directly attached to the container, the cap sized at least as large as a diameter of the upper cavity of the second compartment, with the cap movable to a closed position adjacent to the terminating end of the second compartment for enclosing the cavity of the second compartment in order to retain the food of choice within the second compartment and movable away from the terminating end of the second compartment to an open position so that the cavity is accessible to gain access to the food of choice within the second compartment, the connector portion of the cap remaining directly attached to the container when the cap is in the closed position and the open position, and while the cap is being moved between the open and closed positions.*

* * * * *

UNITED STATES PATENT AND TRADEMARK OFFICE

CERTIFICATE OF CORRECTION

PATENT NO. : RE45,935 E
APPLICATION NO. : 14/313658
DATED : March 22, 2016
INVENTOR(S) : Edward L. Taufer It is certified that error appears in the above-identified patent and that said Letters Patent is hereby corrected as shown below:

Claims

In claim 19

In column 8, at line 31, please change "the shell" to --a second shell--; at line 59, please change "the shell" to --the second shell--; at line 60, please change "the shell" to --the second shell--; and at line 64, please change "the shell" to --the second shell--.

In column 9, at line 3, please change "the shell" to --the second shell--; at line 7, please insert --second-- before "shell"; and at line 11, please change "the shell" to --the second shell--.

Signed and Sealed this
Twenty-eighth Day of June, 2016

Michelle K. Lee

Michelle K. Lee
*Director of the United States Patent and Trademark Office*